(12) United States Patent
Teegan et al.

(10) Patent No.: US 7,865,924 B2
(45) Date of Patent: Jan. 4, 2011

(54) PROVIDING INPUT AND OUTPUT FOR A MOBILE DEVICE

(75) Inventors: Hugh A. Teegan, Redmond, WA (US); Ishdeep S. Sawhney, Redmond, WA (US); Eric I. Chang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 652 days.

(21) Appl. No.: 11/633,834

(22) Filed: Dec. 5, 2006

(65) Prior Publication Data

US 2008/0026793 A1 Jan. 31, 2008

Related U.S. Application Data

(60) Provisional application No. 60/833,733, filed on Jul. 27, 2006.

(51) Int. Cl.
*H04N 7/16* (2006.01)
*H04B 1/00* (2006.01)
(52) U.S. Cl. .................. 725/62; 455/3.03; 455/3.06
(58) Field of Classification Search .............. 725/62; 455/3.01, 3.03, 3.06
See application file for complete search history.

(56) References Cited

U.S. PATENT DOCUMENTS

| | | | | |
|---|---|---|---|---|
| 4,545,023 | A | 10/1985 | Mizzi .......................... | 364/709 |
| 6,016,248 | A | 1/2000 | Anzai et al. ................. | 361/683 |
| 6,189,056 | B1 | 2/2001 | Ogura et al. | |
| 6,997,561 | B2 | 2/2006 | Bierhuizen | |
| 7,010,312 | B1 | 3/2006 | Zechlin | |
| 7,580,005 | B1 * | 8/2009 | Palin .......................... | 345/1.1 |
| 2001/0016056 | A1 | 8/2001 | Westphal et al. | |
| 2003/0040334 | A1 | 2/2003 | Lee | |

(Continued)

FOREIGN PATENT DOCUMENTS

KR 1999-0051306 7/1999

(Continued)

OTHER PUBLICATIONS

Mark Butler et al., "Device Independence and the Web[1]", Information Infrastructure Laboratory, HP Laboratories Bristol, HPL-2002-249, http://www.hpl.hp.com/research/papers/2003/device_independence.pdf, Sep./Oct. 2, 2002, pp. 81-86.

(Continued)

*Primary Examiner*—Lee Nguyen
(74) *Attorney, Agent, or Firm*—Merchant & Gould

(57) ABSTRACT

Providing input and output for a mobile device may be provided. At a mobile device, input may be received from at least one of a plurality of remote input devices. The plurality of remote input devices may be remote from the mobile device. The mobile device may have at least one local input device. The at least one of the plurality of remote input devices may have a greater form factor than the local input device. Next, the received input may be processed. The mobile device may transmit the output to at least one of the plurality of remote output devices. The plurality of remote output devices may be remote from the mobile device. The mobile device may have at least one local output device. The at least one of the plurality of remote output devices may have a greater form factor than the local output device.

20 Claims, 3 Drawing Sheets

U.S. PATENT DOCUMENTS

| | | | |
|---|---|---|---|
| 2003/0223185 A1 | 12/2003 | Doczy et al. | 361/680 |
| 2004/0158855 A1* | 8/2004 | Gu et al. | 725/39 |
| 2005/0286715 A1 | 12/2005 | Cheah et al. | |
| 2006/0203758 A1* | 9/2006 | Tee et al. | 370/315 |
| 2007/0010261 A1* | 1/2007 | Dravida et al. | 455/456.3 |

FOREIGN PATENT DOCUMENTS

| | | |
|---|---|---|
| WO | WO 03/042851 A3 | 5/2003 |
| WO | WO 03/077550 A1 | 9/2003 |
| WO | WO 2004/036725 A2 | 4/2004 |
| WO | WO 2004/102960 A1 | 11/2004 |

OTHER PUBLICATIONS

Bill N. Schilit et al., "Device Ensembles [ubiquitous computing]", Published by the IEEE Computer Society, http://ieeexplore.ieee.org/iel5/2/30050/01377047.pdf?tp=&arnumber=1377047&isnumber=30050, Dec. 2004, pp. 56-64.

Philip Greenspun, "Mobile Phone As Home Computer", http://Philip.greenspun.com/business/mobile-phone-as-home-computer, Sep. 2005, pp. 1-8.

International Search Report dated Dec. 7, 2007 cited in International Application No. PCT/US2007/014789.

Chinese First Office Action dated Aug. 27, 2010 cited in Application No. 200780027802.X.

* cited by examiner

PROVIDING INPUT AND OUTPUT FOR A MOBILE DEVICE

RELATED APPLICATION

Under provisions of 35 U.S.C. §119 (e), the Applicants claim the benefit of U.S. provisional application No. 60/833,733, entitled "Extension of the Capabilities of the Wireless Phone", filed Jul. 27, 2006, which is incorporated herein by reference.

BACKGROUND

A mobile device may be used as a principal computing device for many activities. The small form factor associated with the mobile device, however, makes input and output difficult due to the mobile device's small size. Conventional input and output processes are not universal for the mobile device's capabilities. For example, a conventional mobile device may be equipped with a "TVOut" capability allowing output from the mobile device to be displayed on a television (TV.) The conventional TVOut capability, when provided for the mobile device, works only with particular applications written specifically for the TVOut capability. Conventional processes do not allow the TVOut capability to be used uniformly by all applications within the mobile device. In addition, conventional processes do not allow an interface device (e.g. a mouse) to navigate all applications in real time in the mobile device.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Input and output for a mobile device may be provided. For example, at a mobile device, input may be received from at least one of a plurality of remote input devices. The at least one of the plurality of remote input devices may be remote from the mobile device. The mobile device may have at least one local input device. In addition, the at least one of the plurality of remote input devices may have a greater form factor than the at least one local input device. Next, the mobile device may process received input. Then, from the mobile device, the output may be transmitted to at least one of the plurality of remote output devices. The transmitted output may be based on the processed input. The at least one of the plurality of remote output devices may be remote from the mobile device. The mobile device may have at least one local output device. The at least one of the plurality of remote output devices may have a greater form factor than the at least one local output device.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
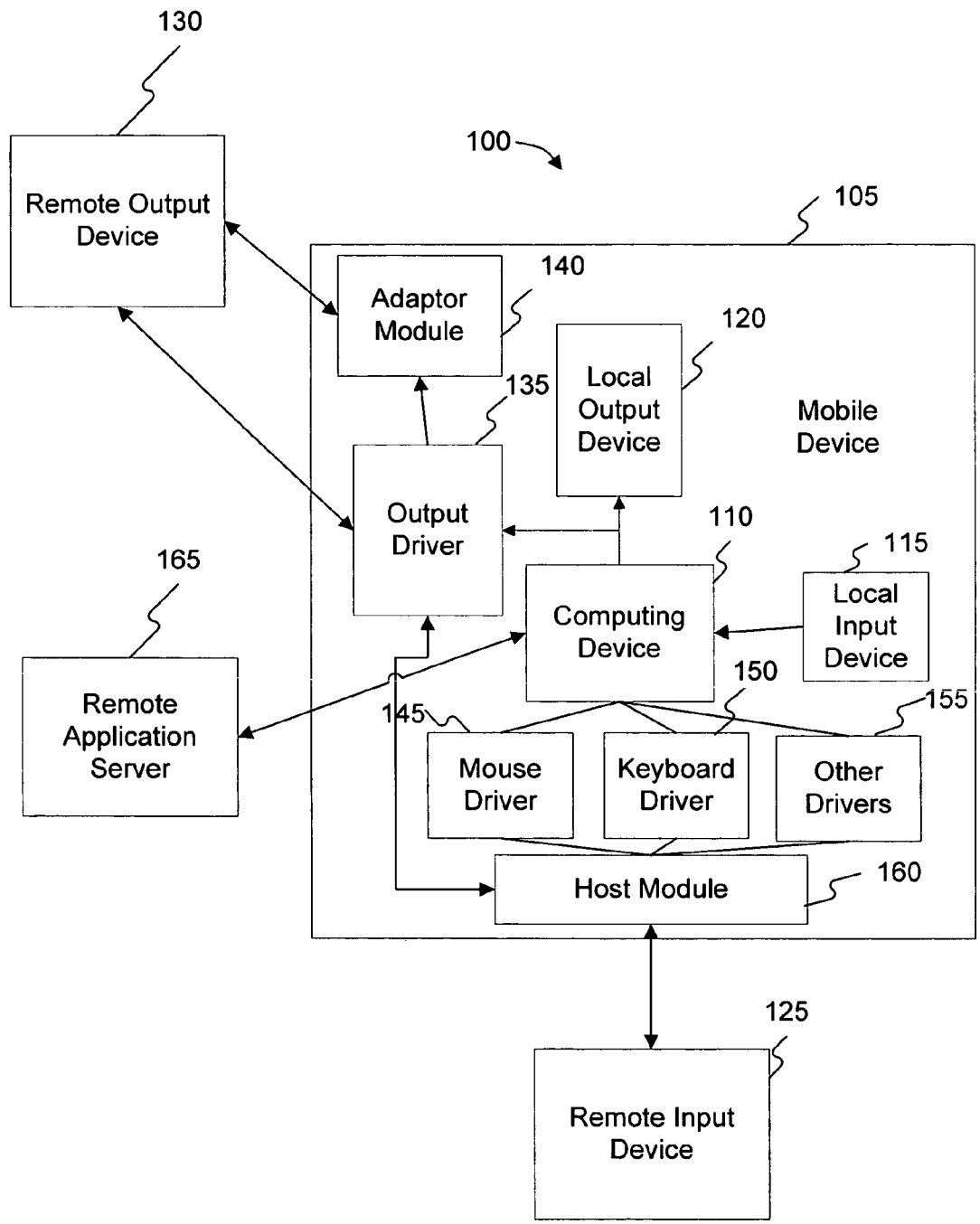
FIG. 1 is a block diagram of an input and output system.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the appended claims define the proper scope of the invention.

A mobile device may be used as a principal computing device for many activities. A small form factor for the mobile device, however, may make input and output difficult. Embodiments of the present invention may attach more convenient input devices and output devices to the mobile device. For example, a full size keyboard and mouse may be used by the mobile device. In addition, a TV or other display to be used as a display for the mobile device. Conventional input and output processes are not universal for all the mobile device's capabilities. Embodiments of the present invention, however, may allow applications on the mobile device to use, for example, a TVOut capability uniformly. Furthermore, embodiments of the present invention may allow a human interface device, such as a mouse, to navigate all applications on the mobile device in real time.

FIG. 1 is a block diagram of an input and output system 100. Consistent with embodiments of the present invention, system 100 may comprise a mobile device 105, a remote input device 125, a remote output device 130, and a remote application server 165.

Mobile device 105 may comprise a computing device 110, a local input device 115, a local output device 120, an output driver 135, an adaptor module 140, a mouse driver 145, a keyboard driver 150; an other driver 155, and a host module 160. Computing device 110 is described in more detail below with respect to FIG. 3. Mobile device 105 may comprise, but is not limited to, a mobile telephone, a cellular telephone, a wireless telephone, a wireless device, a hand-held personal computer, a hand-held computing device, a multi-processor system, a micro-processor-based or programmable consumer electronic device, a personal digital assistant (PDA), a telephone, a pager, or any other device configured to receive, processing, and transmitting information. For example, mobile device 105 may comprise an electronic device configured to communicate wirelessly and be small enough for a user to carry the electronic device easily. In other words, mobile device 105 may be smaller than a notebook computer and may comprise a mobile telephone or PDA having both local input device 115 and local output device 120.

Local input device 115 may be a keypad, number pad, or a touch device configured to provide local input for mobile device 105. Local input device 115 may have a small form factor to enable its placement on mobile device 105 being small enough for a user to easily carry. Local input device 115 may comprise, but not limited to: i) a keyboard with fewer keys than a standard keyboard; ii) a number pad used, for example, to dial a telephone; iii) a keypad with combination number and letter keys; or iv) a touch screen. For example, local input device 115 may comprise combination number and letter keys to allow data entry in either numeric form or character form using the same key. The aforementioned are examples and local input device 115 may comprise an input device compatible with mobile device 105's small size.

Local output device 120 may be a screen with a small form factor to enable placement on mobile device 105 being small enough for a user to easily carry. Local output device 120 may comprise, but is not limited to: i) a liquid crystal display (LCD) screen; ii) an organic light-emitting device (OLED) screen; iii) a light-emitting device (LED) screen; iv) a field emission display; or v) a touch screen. For example, local output device 120 may comprise an LCD screen output, sized to fit mobile device 105's small form factor. The aforementioned are examples and local output device 120 may comprise an output device compatible with mobile device 105's small size.

Output driver 135 may provide communication between mobile device 105 and remote output device 130. Output driver 135 may be configured to convert an instruction, a setting, a resolution, or a format. The input to output driver 135 may be a signal or a data stream sent from computing device 110 or host module 160. Output driver 135 may convert this input to a different set of instructions, a different setting, a different resolution, or a different format, suitable for a peripheral device, for example, remote output device 130. For example, output driver 135 may convert a signal, formatted for local output device 120 to a higher resolution signal (e.g. a video-out format) for remote output device 130. In addition, output driver 135 may take a signal and convert it to any of the following video formats: i) composite; ii) red-green-blue (RGB); iii) phase alternating line (PAL); iv) national television standards committee (NTSC); v) sequential color with memory (SECAM); vi) super-video (S-VIDEO); vii) digital versatile disc; viii) high definition television; ix) content scrambling; x) video graphics array (VGA); or xi) digital visual interface (DVI). Output driver 135 may convert a signal or a data stream for use by host module 160.

Adaptor module 140 may allow mobile device 105 to connect with remote output device 130. Adaptor module 140 may be a separate component from mobile device 105 that may plug into mobile device 105 through a port or a driver. Adaptor module 140 may be inside or outside mobile device 105. Adaptor module 140 may allow a larger size remote input device 125 or remote output device 130 to interface with mobile device 105. Adaptor module 140 may be configured to convert a signal characteristic, an instruction, a setting, a resolution, or a format. The input to adaptor module 140 may be a signal or data stream sent from computing device 110, output driver 135, or host module 160. Adaptor module 140 may allow for multiplexed communications (e.g. over Universal Serial Bus (USB)) with remote output device 130. Adaptor module 140 may convert this input to a different signal characteristic, a different instruction, a different setting, a different resolution, or a different format suitable for a peripheral device, for example remote output device 130. Adaptor module 140 may be, for example, a display adaptor, a network controller, a printer controller, or a controller for a storage device. For example, adaptor module 140 may take an analog signal formatted for local output device 120 and convert it to a digital signal for use by remote output device 130. In addition, adaptor module 140 may take a video-out signal from output driver 135 and convert it to any of the following video formats: i) composite; ii) red-green-blue (RGB); iii) phase alternating line (PAL); iv) national television standards committee (NTSC); v) sequential color with memory (SECAM); vi) super-video (S-VIDEO) vii) digital versatile disc; viii) high definition television; ix) content scrambling; x) video graphics array (VGA); or xi) digital visual interface (DVI).

Adaptor module 140 may drive one of local output device 120 and remote output device 130 with a first content while output driver 135 may drive the other of local output device 120 and remote output device 130 with a second content. For example, output driver 135 may drive local output device 120 with the first content and adaptor module 140 may drive remote output device 130 with the first or second content.

Mouse driver 145, keyboard driver 150, or other driver 155 may connect mobile device 105 and a peripheral device such as remote input device 125. Mouse driver 145, keyboard driver 150, or other driver 155 may be configured to convert an instruction, a setting, a resolution, or a format. Mouse driver 145, keyboard driver 150, or other driver 155 may connect to the peripheral device and convert an input from the peripheral device to a different set of instructions, a different setting, a different resolution, or a different format, suitable for computing device 110.

Host module 160 may connect USB compliant devices with mobile device 105. Host module 160 may for example, allow mobile device 105 to process as either a USB host or a USB client. For example, host module 160 may allow mobile device 105 to connect with a remote USB hub that may interconnect with various USB compliant devices. Host module 160 may connect with the USB compliant devices through a wire or wirelessly. Host module 160 may allow for multiplexed communications with, for example, the USB compliant devices.

Remote input device 125 may be an input device located remotely from mobile device 105. Remote input device 125 may comprise an input device having a size or configuration not limited by mobile device 105's small form factor. Remote input device 125 may comprise the following: i) a keyboard; ii) a mouse; iii) a virtual keyboard; iv) a touch screen; v) a compact disc (CD) player; vi) a digital versatile disc (DVD) player/recorder; vii) a storage device such as a micro-drive or a compact flash; viii) a network switch or hub; ix) a personal area network device; x) a modem; or xi) a television receiver. Remote input device 125 may connect to mobile device 105 through a wire, wirelessly, or through a USB adaptor, port, or hub. For example, remote input device 125 may be a full sized keyboard connected through a USB hub connected to host module 160. The aforementioned are examples and remote input device 125 may comprise any remotely located input device not limited by mobile device 105's small size.

Remote output device 130 may be an output device remotely located from mobile device 105. Remote output device 130 may comprise an output device not limited by mobile device 105's small form factor. Remote output device 130 may comprise one of the following: i) a TV; ii) a monitor; iii) a liquid crystal display (LCD) screen; iv) a projector; v) a printer; vi) a network switch or hub; vii) a personal area network device; viii) a DVD recorder; ix) a speaker, or x) a storage device such as a micro-drive or a compact flash memory. The aforementioned are examples and remote output device 130 may comprise any remotely located output device not limited by mobile device 105's small size.

Remote application server 165 may be a computer in a client/server configuration. Remote application server 165 may also host software in an intranet/Internet environment. Remote application server 165 may be remotely located from mobile device 105. Remote application server 165 may comprise, for example, one of the following: i) a network access server; ii) a two-tier or three-tier client-server system; iii) a database server; iv) a database management system; v) a file server; vi) a client application server; vii) an HTTP server; viii) a web server; ix) an e-mail server; x) a web application server; or xi) any of a class of software servers providing scripts, applets, database queries, or general business programs in an intranet/Internet environment.

In addition, remote application server 165 may be a computer in a client/server configuration and serve an executable program and a database record to mobile device 105. In addition, remote application server 165 may serve an applet or script to mobile device 105 through a web connection. Remote application server 165 may serve software or files. For example, remote application server 165 may serve any one or more of the following: i) an e-mail program; ii) a video program; iii) a music player; iv) a word processing program; v) a spreadsheet program; vi) a platform independent executable code; vii) a web browser; viii) a file or database record associated with a program; or ix) a web page. The aforementioned are examples and remote application server 165 may comprise any remote computing device and may serve any modules or data.

Figure 2:
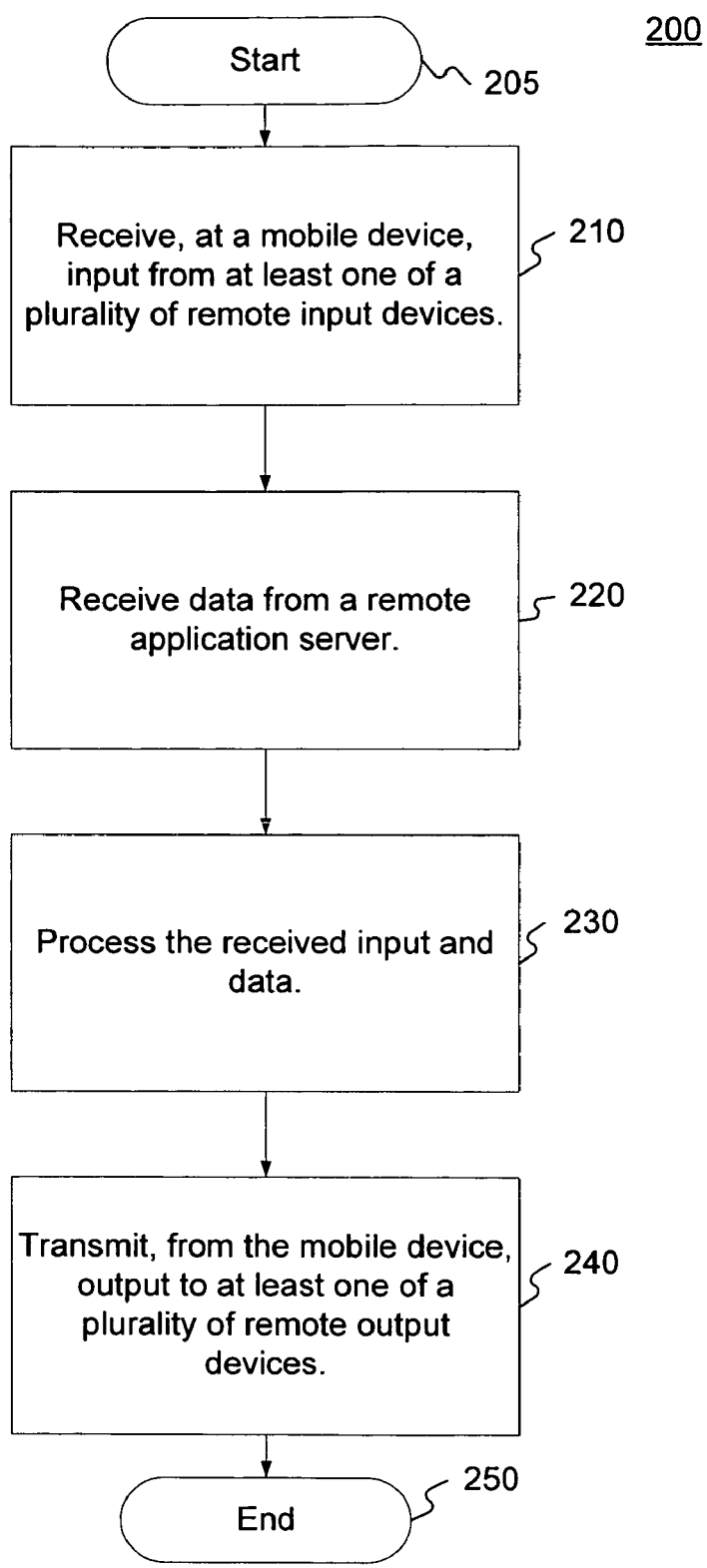
FIG. 2 is a flow chart of a method for providing input and output for a mobile device.

FIG. 2 is a flow chart setting forth the general stages involved in a method 200 consistent with an embodiment of the invention for providing input and output for a mobile device. Method 200 may be implemented using a computing device 110 within mobile device 105 as described in more detail above with respect to FIG. 1. Ways to implement the stages of method 200 will be described in greater detail below. Method 200 may begin at starting block 205 and proceed to stage 210 where mobile device 105 may receive input from at least one of a plurality of remote input devices. For example, a user, not having a personal computer, may use mobile device 105 instead. A local keypad on mobile device 105 may make use of mobile device 105 cumbersome, error prone, and difficult. The user, on a business trip for example, may use mobile device 105 in many similar applications the user might use the personal computer. The user may connect a keyboard and a mouse through resident mouse driver 145 and keyboard driver 150. In addition, the keyboard and the mouse may connect through a USB hub or through adaptor module 140. To receive a software application or a file, the user may connect a compact flash or a modem to mobile device 105. Once away from the office, the user may need to have access to a server at the user's workplace. Through the connected modem, the user may receive data from the workplace server.

From stage 210, where mobile device 105 receives input, method 200 may advance to stage 220 where mobile device 105 may receive data from remote application server 165. For example, the user may receive an e-mail with an attachment such as a word processor file from remote application server 165. The user, needing to view the word processor file, may receive a compatible word processor program from remote application server 165, after attempting to open the attachment. The user, using mobile device 105, may download a music video or open a web page, served by remote application server 165. The e-mail, music video, and web page may run on compatible applications the user previously downloaded from remote application server 165. The user may receive a database file, while logged into a secure file server. The user may authenticate the login to the secure file server, located at the user's workplace, using a web access that serves an applet from remote application server 165.

Figure 3:
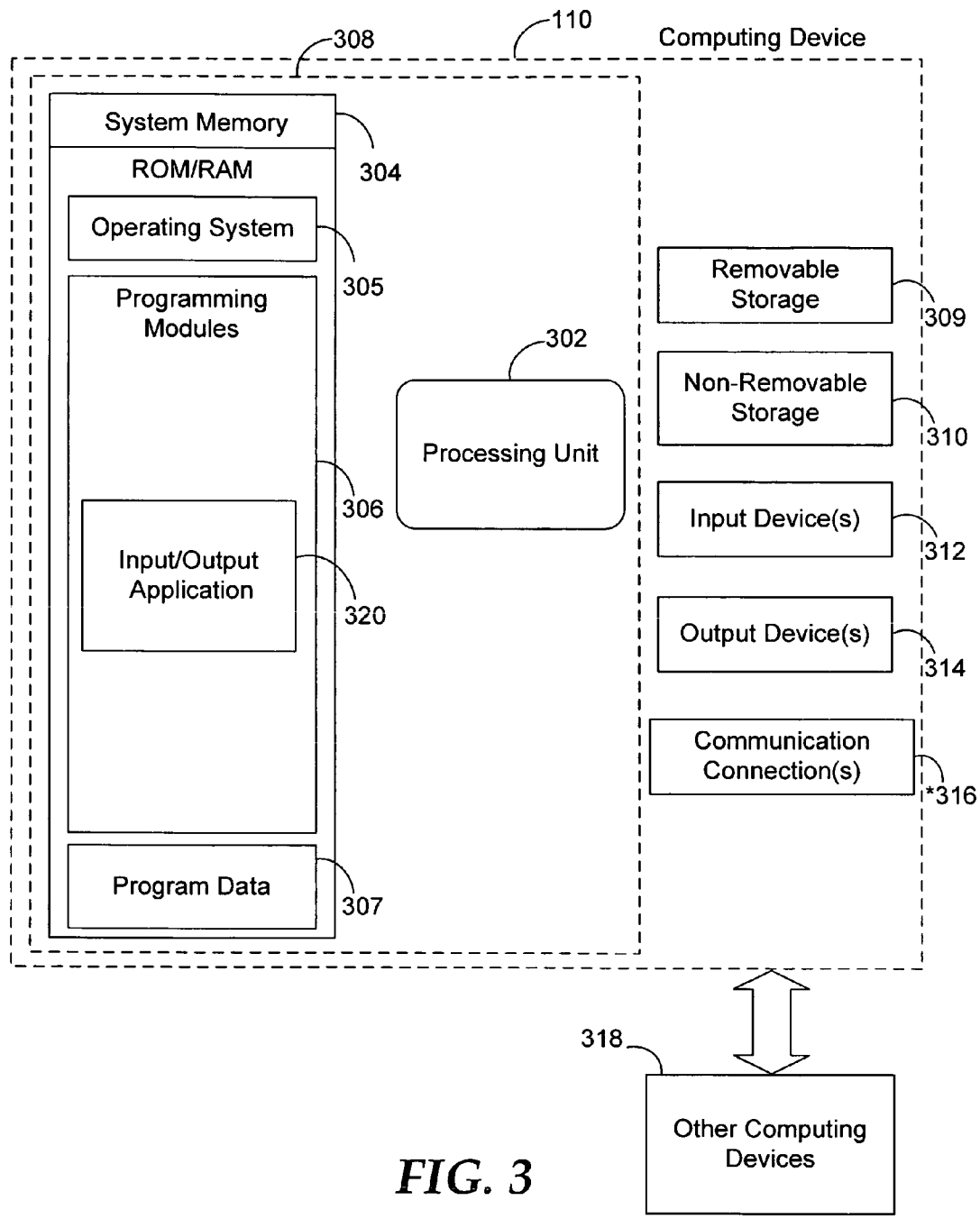
FIG. 3 is a block diagram of a system including a computing device.

Once mobile device 105 receives data from remote application server 165 in stage 220, method 200 may continue to stage 230 where mobile device 105 may process the received input and data. For example, the user may edit the word processor file on mobile device 105 and save the edited file in system memory 304 as illustrated in FIG. 3, and described in more detail below with respect to FIG. 3. The user may view the downloaded music video with an application running on mobile device 105. In addition, the user may reply to the earlier received e-mail, sending another file as an attachment. While editing a file on mobile device 105, the user may copy information from an e-mail and paste the information to the file. Furthermore, the user may open the e-mail and be editing with the word processor simultaneously on mobile device 105.

After mobile device 105 processes the received input and data in stage 230, method 200 may proceed to stage 240 where mobile device 105 may transmit output to at least one of a plurality of remote output devices. For example, while editing the word processor file, the user may connect to a television in a hotel room, using output driver 135. To view directions to an airport from a stored map on user device 105, the user may connect an LCD monitor in an automobile to the USB hub. While flying back home, the user may connect mobile device 105 to the LCD screen attached to the airplane's seat and play a video game, displaying the same output as mobile device 105's LCD screen. While playing the video game, the user may listen to music through a set of connected earphones. Once home, the user may show a friend the music video by connecting to the friend's high definition television using adaptor module 140. Days later at work, the user may connect mobile device 105 to a network switch through the USB hub and upload the edited word processor file. Once mobile device 105 transmits output in stage 240, method 200 may then end at stage 250.

An embodiment consistent with the invention may comprise a system for providing input and output for a mobile device. The system may comprise a memory storage and a processing unit coupled to the memory storage. The processing unit may be operative to receive, at the mobile device, the input from at least one of a plurality of remote input devices. The at least one of the plurality of remote input devices may be remote from the mobile device. The mobile device may have at least one local input device. The at least one of the plurality of remote input devices may have a greater form factor than the at least one local input device. The processing unit may be further operative to process the received input. Furthermore, the processing unit may be operative to transmit, from the mobile device, the output to at least one of a plurality of remote output devices. The processed input may be the basis for the transmitted output. The at least one of the plurality of remote output devices may be remote from the mobile device. The mobile device may have at least one local output device wherein the at least one of the plurality of remote output devices has a greater form factor than the at least one local output device.

Another embodiment consistent with the invention may comprise a system for providing input and output for a mobile device. The system may comprise a memory storage and a processing unit coupled to the memory storage. The processing unit may be operative to receive input from a remote input device that may be remote from the mobile device having a local input device. The remote input device may have a greater form factor than the local input device. The processing unit may be further operative to receive data from a remote server and to process the received input and the received data. In addition, the processing unit may be operative to send output to a remote output device. The processed input and the received data may form a basis for the sent output. The remote output device may be remote from the mobile device having a local output device. The remote output device may have a greater form factor than the local output device.

Yet another embodiment consistent with the invention may comprise a system for providing input and output for a mobile device. The system may comprise a memory storage and a processing unit coupled to the memory storage. The processing unit may be operative to receive the input from at least one of a plurality of remote input devices. The at least one of the plurality of remote input devices may be remote from the mobile device. The mobile device may have at least one local input device. The at least one of the plurality of remote input devices may be more ergonomic than the at least one local input device. The processing unit may be further operative to transmit the output to at least one of a plurality of remote output devices. The input may be a basis for the transmitted output. The at least one of the plurality of remote output devices may be remote from the mobile device. The mobile device may have at least one local output device. The at least one of the plurality of remote output devices may be more ergonomic than the at least one local output device.

FIG. 3 is a block diagram of a system including computing device 110. Consistent with an embodiment of the invention, a memory storage and a processing unit may be implemented in a computing device, such as computing device 110 of FIG. 1. Any suitable combination of hardware, software, or firmware may be used to implement the memory storage and processing unit. For example, the memory storage and processing unit may be implemented with computing device 110 or any of an other computing device 318, in combination with computing device 110. The aforementioned system, device, and processors are examples and other systems, devices, and processors may comprise the aforementioned memory storage and processing unit, consistent with embodiments of the invention.

With reference to FIG. 3, a system consistent with an embodiment of the invention may include a computing device, such as computing device 110. In a basic configuration, computing device 110 may include at least one of a processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include an operating system 305, one or more of a programming module 306, and may include a program data 307. Operating system 305, for example, may be suitable for controlling computing device 110's operation. In one embodiment, programming modules 306 may include input/output applications, for example an input/output application module 320. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 110 may have additional features or functionality. For example, computing device 110 may also include additional data storage devices (removable and/or non-removable) such as, for example, a magnetic disk, an optical disk, or a tape. Such additional storage is illustrated in FIG. 3 by a removable storage 309 and a non-removable storage 310. Computer storage media may include a volatile and a nonvolatile, a removable and a non-removable media implemented in any method or technology for storage of information, such as computer readable instructions, data structures, program modules, or other data. System memory 304, removable storage 309, and non-removable storage 310 are all computer storage media examples (i.e. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 110. Any such computer storage media may be part of computing device 110. Computing device 110 may also have an input device(s) 312 such as a keyboard, a mouse, a pen, a sound input device, a touch input device, etc. An output device(s) 314 such as a display, speakers, a printer, etc. may also be included. Computing device 110 may also function within mobile device 105, mobile device 105 may be a mobile telephone, a cellular telephone, a wireless telephone, a wireless device, a hand-held personal computer, a hand-held computing device, a multi-processor system, a microprocessor-based or programmable consumer electronic device, a personal digital assistant (PDA), a telephone, or a pager. The aforementioned devices are examples and others may be used.

Computing device 110 may also contain a communication connection 316 that may allow device 110 to communicate with other computing devices 318, such as over a network in a distributed computing environment, for example, an intranet or the Internet. A communication connection 316 is one example of communication media. Communication media may typically be embodied by computer readable instructions, data structures, program modules, or other data in a modulated data signal, such as a carrier wave or another transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 304, including operating system 305. While executing on processing unit 302, programming modules 306 (e.g. input/output application 320) may perform processes including, for example, one or more method 200's stages as described above. The aforementioned process is an example and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing input and output for a mobile device, the method comprising:
    receiving, at the mobile device, the input from at least one of a plurality of remote input devices, the at least one of the plurality of remote input devices being remote from the mobile device, the mobile device having at least one local input device wherein the at least one of the plurality of remote input devices has a greater form factor than the at least one local input device;
    processing the received input, wherein processing the received input comprises receiving one of the following: an applet and a script associated with the received input; and
    transmitting, from the mobile device, the output to at least one of a plurality of remote output devices and at least one local output device associated with the mobile device, the transmitted output being based on the processed input, wherein the at least one of the plurality of remote output devices has a greater form factor than the at least one local output device, and wherein transmitting, from the mobile device, the output to at least one of the plurality of remote output devices comprises:
        outputting a first content to the at least one of the plurality of remote output devices, and
        outputting a second content to the at least one local output device.

2. The method of claim 1, wherein receiving, at the mobile device, comprises receiving at the mobile device comprising one of the following:
    a mobile telephone, a cellular telephone, a wireless telephone, a wireless device, a hand-held personal computer, a hand-held computing device, a multiprocessor system, microprocessor-based or programmable consumer electronic device, a personal digital assistant (PDA), a telephone, and a pager.

3. The method of claim 1, wherein receiving, at the mobile device, the input from the at least one of the plurality of remote input devices comprises receiving, at the mobile device, the input from the at least one of the plurality of remote input devices through at least one of a plurality of corresponding local input drivers resident on the mobile device.

4. The method of claim 1, wherein receiving, at the mobile device, the input from the at least one of the plurality of remote input devices comprises receiving, at the mobile device, the input from the at least one of the plurality of remote input devices associated with one of the following: a keyboard, a mouse, and a storage device.

5. The method of claim 1, wherein processing the received input comprises processing the received input using data received from a remote application server.

6. The method of claim 1, wherein transmitting, from the mobile device, the output comprises transmitting, from the mobile device, the output being created from a signal driving the at least one local output device from a processing unit located on the mobile device.

7. The method of claim 1, wherein transmitting, from the mobile device, the output comprises transmitting, from the mobile device, the output comprising one of the following formats: composite, red-green-blue (RGB), phase alternating line (PAL), national television standards committee (NTSC), sequential color with memory (SECAM), super-video (S-VIDEO), video graphics array (VGA), and digital visual interface (DVI).

8. The method of claim 1, wherein transmitting, from the mobile device, the output comprises transmitting, from the mobile device, the output from one of two output drivers comprising a first output driver and a second output driver, the first output driver comprising a video out driver and the second output driver being configured to produce the output in at least one of the following formats: composite, red-green-blue (RGB), phase alternating line (PAL), national television standards committee (NTSC), sequential color with memory (SECAM), super-video (S-VIDEO), video graphics array (VGA), and digital visual interface (DVI).

9. A system for providing input and output for a mobile device, the system comprising:
 a memory storage; and
 a processing unit coupled to the memory storage, wherein the processing unit is operative to:
  receive input from a remote input device being remote from the mobile device having a local input device wherein the remote input device has a greater form factor than the local input device;
  receive data from a remote application server, the remote application server being configured to serve at least one of the following: an executable program, a database record, an applet, and a script associated with the received input;
  process the received input and the received data, wherein the received input is associated with the data received from the remote application server; and
  send output to a remote output device, the sent output being based on the processed input and the received data, the remote output device being remote from the mobile device having a local output device wherein the remote output device has a greater form factor than the local output device.

10. The system of claim 9, wherein the mobile device comprises one of the following: a mobile telephone, a cellular telephone, a wireless telephone, a wireless device, a hand-held personal computer, a hand-held computing device, a multiprocessor system, microprocessor-based or programmable consumer electronic device, a personal digital assistant (PDA), a telephone, and a pager.

11. The system of claim 9, wherein the processing unit being operative to send comprises the processing unit being operative to send, from the mobile device, the output being created from a signal driving the local output deice from the processing unit located on the mobile device.

12. The system of claim 9, wherein the processing unit being operative to send comprises the processing unit being operative to send, from the mobile device, the output from one of two output drivers comprising a first output driver and a second output driver, the first output driver comprising a video out driver and the second output driver being configured to produce the output in at least one of the following formats: composite, red-green-blue (RGB), phase alternating line (PAL), national television standards committee (NTSC), sequential color with memory (SECAM), super-video (S-VIDEO), video graphics array (VGA), and digital visual interface (DVI).

13. A computer-readable storage medium which stores a set of instructions which when executed performs a method for providing input and output for a mobile device, the method executed by the set of instructions comprising:
 receiving, at the mobile device, the input from at least one of a plurality of remote input devices, the at least one of the plurality of remote input devices being remote from the mobile device, the mobile device having at least one local input device wherein the at least one of the plurality of remote input devices is more ergonomic than the at least one local input device;
 processing the received input, wherein processing the received input comprises receiving, through a web connection, one of the following: an applet and a script associated with the received input; and
 transmitting, from the mobile device, the output to at least one of a plurality of remote output devices and at least one local output device associated with the mobile device, the transmitted output being based on the processed input, wherein the at least one of the plurality of remote output devices has a greater form factor than the at least one local output device.

14. The computer-readable storage medium of claim 13, wherein receiving, at the mobile device, comprises receiving at the mobile device comprising one of the following: a mobile telephone, a cellular telephone, a wireless telephone, a wireless device, a hand-held personal computer, a hand-held computing device, a multiprocessor system, microprocessor-based or programmable consumer electronic device, a personal digital assistant (PDA), a telephone, and a pager.

15. The computer-readable storage medium of claim 13, wherein receiving, at the mobile device, the input from the at least one of the plurality of remote input devices comprises receiving, at the mobile device, the input from the at least one of the plurality of remote input devices through at least one of a plurality of corresponding local input drivers resident on the mobile device.

16. The computer-readable storage medium of claim 13, wherein receiving, at the mobile device, the input from the at least one of the plurality of remote input devices comprises receiving, at the mobile device, the input from the at least one of the plurality of remote input devices associated with one of the following: a keyboard, a mouse, and a storage device.

17. The computer-readable storage medium of claim 13, wherein transmitting, from the mobile device, the output comprises transmitting, from the mobile device, the output being created from a signal driving the at least one local output deice from a processing unit located on the mobile device.

18. The computer-readable storage medium of claim 13, wherein transmitting, from the mobile device, the output comprises transmitting, from the mobile device, the output comprising one of the following formats: composite, red-green-blue (RGB), phase alternating line (PAL), national television standards committee (NTSC), sequential color with memory (SECAM), super-video (S-VIDEO), video graphics array (VGA), and digital visual interface (DVI).

19. The computer-readable storage medium of claim 13, wherein transmitting, from the mobile device, the output comprises transmitting, from the mobile device, the output from one of two output drivers comprising a first output driver and a second output driver, the first output driver comprising a video out driver and the second output driver being configured to produce the output in at least one of the following formats: composite, red-green-blue (RGB), phase alternating line (PAL), national television standards committee (NTSC), sequential color with memory (SECAM), super-video (S-VIDEO), video graphics array (VGA), and digital visual interface (DVI).

20. The computer-readable storage medium of claim 13, further comprising processing the received input using data received from a remote application server.

* * * * *